US012592481B2

(12) United States Patent
Cunado et al.

(10) Patent No.: US 12,592,481 B2
(45) Date of Patent: Mar. 31, 2026

(54) LAMP FIXTURE WITH EMBEDDED ANTENNA

(71) Applicants: Daniel A Cunado, Simi Valley, CA (US); Glenn Tyson, Simi Valley, CA (US)

(72) Inventors: Daniel A Cunado, Simi Valley, CA (US); Glenn Tyson, Simi Valley, CA (US)

( * ) Notice: Subject to any disclaimer, the term of this patent is extended or adjusted under 35 U.S.C. 154(b) by 90 days.

(21) Appl. No.: 18/529,917

(22) Filed: Dec. 5, 2023

(65) Prior Publication Data

US 2024/0186692 A1 Jun. 6, 2024

Related U.S. Application Data

(60) Provisional application No. 63/386,152, filed on Dec. 5, 2022.

(51) Int. Cl.
*H01Q 1/44* (2006.01)
*H05B 47/19* (2020.01)

(52) U.S. Cl.
CPC ............... *H01Q 1/44* (2013.01); *H05B 47/19* (2020.01)

(58) Field of Classification Search
CPC ...... F21Y 2115/10; F21V 21/26; F21V 19/02; F21V 23/007; F21V 21/14; F21V 14/02; F21V 29/507; F21V 29/89; F21V 1/08; F21V 14/025; F21V 21/0885; F21V 21/116; F21V 21/0824; F21V 21/30; F21V 15/01; F21L 4/027; F21W 2131/10; F21W 2131/109; F21W 2131/107; F21S 8/081; H05B 45/10; H05B 47/19; H05B 47/10; H01Q 1/44; E04F 2011/1048; Y10S 362/80; Y10S 362/806
See application file for complete search history.

(56) References Cited

U.S. PATENT DOCUMENTS

| | | | | |
|---|---|---|---|---|
| 9,285,103 | B2 * | 3/2016 | Van De Ven | F21V 17/002 |
| 11,612,044 | B1 * | 3/2023 | Hedman | F21V 23/0435 |
| 2014/0119022 | A1 * | 5/2014 | Beausoleil | F21V 21/0824 362/294 |
| 2015/0362157 | A1 * | 12/2015 | Beausoleil | F21V 23/0435 362/232 |

* cited by examiner

*Primary Examiner* — Monica C King
(74) *Attorney, Agent, or Firm* — Colin P. Abrahams

(57) ABSTRACT

A lamp fixture comprises a housing having a portion which comprises a non-conductive material. A receiver for receiving signals from a remote source is located within the housing. A receiving antenna is connected to the receiver and extends through the housing such that a least a portion of the antenna is accommodated within the portion of the housing comprised of the non-conductive material.

13 Claims, 9 Drawing Sheets

BILL OF MATERIAL

| | | | | |
|---|---|---|---|---|
| 25 | Reflector | LED Reflector | 1 | Each |
| 24 | Optica Reflector | Optical diffuser | 1 | Each |
| 23 | GS-150 | 9"Ground Stack | 1 | Each |
| 22 | Driver casing | Driver assembly with leads | 1 | Each |
| 21 | Diffuser mounting plate | Diffuser mounting plate | 1 | Each |
| 20 | Antenna | Bleutooth mesh Antenna | 1 | Each |
| 19 | 330-0035-2N | Knuckle Stem | 1 | Each |
| 18 | 330-0041-1N | Knuckle, Noryl, 2 hole base | 1 | Each |
| 17 | 3106-COB LED | Cob LEd board with leads | 1 | Each |
| 16 | 300-0918 | Seal optic housing to door cover | 1 | Each |
| 15 | 300-0917 | Seal optic housing to driver housing | 1 | Each |
| 14 | 300-0907 | Gasket, Silicone, Knuckle assmbly | 1 | Each |
| 13 | 300-0012 | O-ring Cross section shape knuckle 20.3 mm x 2.4 mm Buna70 | 1 | Each |
| 12 | 290-0314 | Screw, 4-40 x 3//8", socket cap, hex hd, 18-8 ss | 1 | Each |
| 11 | 290-0308 | Nylon washer, knuckle sub-assy | 1 | Each |
| 10 | 290-0296 | Screw 4-40 x 1" Phil pan m/s 18-8 | 2 | Each |
| 9 | 290-0177 | Screw 1/4-20 x 1/2" Socket hd cap 18-8 | 2 | Each |
| 8 | 290-0145 | Screw 6-32 x 1" Socket hd Cap 18-8 | 4 | Each |
| 7 | 290-0048 | Screw 1/4-20 x 1-1/4" Ph oval hd 18-8 | 1 | Each |
| 6 | 290-0012 | Screw 4-40 x 3/8" Phil Pan M/S 18-8 | 3 | Each |
| 5 | 280-0503 | Lens, Soda lime, clear, heat strengthened Ø2.344x2.7mm | 1 | Each |
| 4 | 260-0022 | 18/2 SPT-I Cable | 6 | Feet |
| 3 | 250-0826 | Die-Cast Aluminum fixed shrod cover 5306. 5315, 1043 | 1 | Each |
| 2 | 250-0822 | Die-Cast Aluminum Driver housing 3105 3106 | 1 | Each |
| 1 | 250-0821 | Die-Cast Aluminum Optic housing 3105, 3106, 3107, 3108, 1043 | 1 | Each |
| I em No. | PART No. | Die-Cast Aluminum Optic housing 3105, 3106, 3107, 3108, 1043 | QTY. | UOM |

FIG. 4(Contd)

BILL OF MATERIAL

| ITEM NO. | PART NO. | DESCRIPTION | QTY. | UOM |
|---|---|---|---|---|
| 18 | ANTENNA | BLUETOOTH MESH ANTENNA | 1 | EACH |
| 17 | BT MESH LAMP | BLUETOOTH MESH LAMP | 1 | EACH |
| 16 | 330-0035-2N | KNUCKLE, STEM | 1 | EACH |
| 15 | 330-0041-1N | KNUCKLE, 2 HOLE BASE | 1 | EACH |
| 14 | 330-0235 | SPRING, T-10437 LARGE | 1 | EACH |
| 13 | 300-0907 | GASKET, SILICONE, KNUCKLE ASSMBLY | 2 | EACH |
| 12 | 300-0044 | SILICONE O-RING NO 133 | 2 | EACH |
| 11 | 300-0012 | O-RING CROSS SECTION SHAPE KNUCKLE 20.3 mm x 2.4 mm BUNA70 | 1 | EACH |
| 10 | 290-0314-BO | SCREW 4-40 X 3/8", SOCKET CAP, HEX HD, BLACK OXIDE | 1 | EACH |
| 9 | 290-0308 | NYLON WASHER, KNUCKLE SUB-ASSY | 1 | EACH |
| 8 | 290-0179 | SCREW, 1/4-20 X 5/8 SOCKET CAP, HEX HD, 18-8 BLACK OXIDE | 2 | EACH |
| 7 | 290-0048 | SCREW 1/4-20 X 1-1/4" PH OVAL HD 18-8 | 1 | EACH |
| 6 | 280-0217 | 2114 2115 2216 2250 2416 CONVEX SODALIME LENS LENS | 1 | EACH |
| 5 | 260-0022 | SPT-1W CABLE 18/2 105 DEG BLACK | 6 | FT |
| 4 | 260-0015 | SPLICE TERMINAL 16-22AWG | 2 | EACH |
| 3 | 260-0011 | MR-16 SOCKET WITH 6" TFE WIRE | 1 | EACH |
| 2 | 250-0048 | DIE-CAST ALUMINUM TOP, 2216, 2250 | 1 | EACH |
| 1 | 250-0023 | DIE-CAST ALUMINUM, HOUSING, 2216 | 1 | EACH |

FIG. 6(Contd)

SABIC Inovative Plastics Noryl GTX NX0031 PPE+PA
Categories: Polymer; Thermoplastic; Polyester, TP; Polyphenylene Ether/PPO Material Notes: NORTL GTX*NX0031 resin is a conductive resin specially designed for electrostatic painting and powder coating applications. This material combines high impact, good flow and conductivity. The material is only available in black and is suitable for injection molding. This data was supplied by SABIC-IP for the Americas region.

Vendors: No vendors are listed for this material. Please click here if you are a supplier and would like information on how to add your listing to this material.

| Physical Properties | Metric | English | Comments |
|---|---|---|---|
| Specific Gravity | 1.09 g/cc | 1.09 g/cc | ASTM D 792 |
| Density | 1.09 g/cc | 0.0394 lb/in$^3$ | ISO 1183 |
| Moisture absorption at Equilibrium | 1.20% | 1.20% | 23°C/50% RH; ISO 62 |
| Water absorption at Saturation | 4.20% @Temperature 23.0°C | 4.20% @Temperature73.4°F | ISO 62 |
| Linear Mold Shrinkage, Flow | 0.013-0.0160 cm/cm @Temperature 3.2mm | 0.013-0.0160 in/in @Temperature 0.126in | SABIC Method |
| Melt Flow | 8.00 g/10 min @Load 5.00kg Temperature 280°C | 8.00 g/10 min @Load 11.00lb Temperature 536°F | ASTM D 1238 |
| | 8.00 g/10 min @Load 5.00kg Temperature 280°C | 8.00 g/10 min @Load 11.00lb Temperature 536°F | [cm^3/10 min] elt volume rate; ISO 1133 |

| Mechanical Properties | Metric | English | Comments |
|---|---|---|---|
| Tensile strength at break | 48.0 MPa | 6960 psi | Typel, 50mm/min; ASTM D 638 |
| | 48.0 MPa | 6960 psi | 50 mm/min; ISO 527 |
| Tensile strength, Yield | 50.0 MPa | 7250 psi | 50 mm/min; ISO 527 |
| | 52.0 MPa | 7540 psi | Typel, 50mm/min; ASTM D 638 |
| Elongation at break | 30.0% | 30.0% | 50 mm/min; ISO 527 |
| | 34.0% | 34.0% | Typel, 50mm/min; ASTM D 638 |
| Elongation at Yield | 4.00% | 4.00% | 50 mm/min; ISO 527 |
| | 5.00% | 5.00% | Typel, 50mm/min; ASTM D 638 |
| Tensile modulus | 2.00 GPa | 290 ksi | 1 mm/min; ISO 527 |
| | 2.25 GPa | 326 ksi | 5 mm/min; ASTM D 638 |

FIG. 7

| | | | |
|---|---|---|---|
| Flexural modulus | 1.90 GPa | 276 ksi | 2 mm/m n; ISO 178 |
| | 2.10 GPa | 305 ksi | 1.3 mm/min; 50 mm span; ASTM D 790 |
| Flexural Yield Strength | 75.0 MPa | 10900 psi | 2 mm/m n; ISO 178 |
| | 79.0 MPa | 11500 psi | 1.3 mm/min; 50 mm span; ASTM D 790 |
| Charpy Impact, Notched | 1.00 J/cm$^2$ @Temperature -30.0°C | 4.76 ft-lb/in$^2$ @Temperature -22.0°C | V-notch Edgew 80*10*4 sp=62mm; ISO 179/1eA |
| | 1.80 J/cm$^2$ @Temperature 23.0°C | 8.57 ft-lb/in$^2$ @Temperature 73.4°F | V-notch Edgew 80*10*4 sp=62mm; ISO 179/1eA |
| Impact Test | 42.0 J @Temperature 23.0°C | 31.0 ft-lb @Temperature 73.4°F | Instrumented impact Total energy; ASTM D 3763 |
| Izod Impact, Notched | 1.17 J/cm$^2$ @Temperature -30.0°C | 2.19 ft-lb/in @Temperature -22.0°F | ASTM D 256 |
| | 2.24 J/cm @Temperature 23.0°C | 4.20 ft-lb/in @Temperature 73.4°F | ASTM D 256 |
| Izod Impact, Notched (ISO) | 10.0 kJ/m$^2$ @Temperature -30.0°C | 4.76 ft-lb/in$^2$ @Temperature -22.0°C | 80*10*4; ISO 180/1A |
| | 20.0 kJ/m$^2$ @Temperature 23.0°C | 9.52 ft-lb/in$^2$ @Temperature 73.4°F | 80*10*4; ISO 180/1A |
| Thermal Properties | Metric | English | C ents |
| CTE, linear, parallel to flow | 100 µm/m-°C @Temperature -40.0-40°C | 55.6 µin/in-°F @Temperature -40.0-104°F | ASTM E 831 |
| | 100 µm/m-°C @Temperature 23.0-60°C | 55.6 µin/in-°F @Temperature 73.0-140°F | ISO 11359-2 |
| CTE, linear, transverse to flow | 90 µm/m-°C @Temperature 23.0-60°C | 50.0 µin/in-°F @Temperature 73.0-140°F | ISO 11359-2 |
| | 100 µm/m-°C @Temperature -40.0-40°C | 55.6 µin/in-°F @Temperature -40.0-104°F | ASTM E 831 |
| Detection temperature at 0.46 MPa (66 psi) | 176°C @Thickness 3.20mm | 349°F @Thickness 0.126in | unannealed; ASTM D 648 |
| Detection temperature at 1.8 MPa (264 psi) | 136°C @Thickness 3.20mm | 277°F @Thickness 0.126in | unannealed; ASTM D 648 |
| Vicat Softening Point | 175°C | 347°F | Rate B/50; ASTM D 1525 |
| | 175°C | 347°F | Rate B/50; ISO 306 |

FIG. 7(Contd)

| | | |
|---|---|---|
| 180°C | 356°F | Rate B/120; ISO 306 |

Some of the values displayed above may have been converted from their original units and/or rounded in order to display the information in a consistent format. Users requiring more precise data for scientific or engineering calculations can click on the property value to see the original value to see the original value as well as raw conversions to equivalent units. We advise that you only use the original value or one of its raw conversions in your calculations to minimize rounding error. We also ask that you refer to MATWeb's terms of use regarding this information. Click here to view all the property value for this datasheet as they were originally entered into MatWeb.

FIG. 7(Contd)

LAMP FIXTURE WITH EMBEDDED ANTENNA

CROSS REFERENCE TO RELATED APPLICATIONS

This application claims the benefit of U.S. Provisional Patent Application No. 63/386,152 filed Dec. 5, 2022, the contents of which are incorporated herein in their entirety.

FIELD AND BACKGROUND

This invention relates to a lamp or luminaire. The lamp or luminaire of the invention is one which has functions and operations that may be managed by a user from an external source whereby instructions are transmitted wirelessly from the external source, such as by Bluetooth or Wi-Fi, to a receiver which is within or forms part of the luminaire, so that the functions or operations may be controlled by appropriate transmissions from the external source.

In the smart landscape and commercial outdoor lighting market, Bluetooth signals are increasingly used to communicate instructions from the system controller to one or multiple luminaires in the landscape, in order to switch on and off, to adjust light intensity or focus, to change light color, to provide some examples only without limiting the possible operations. However, the current construction of luminaires often presents a challenge for reliable signal reception over an acceptable range. Some of the solutions which are currently available are as set out below.

One such solution is that the receiving component, typically an antenna, is left to reside on the LED engine (driver) located within the luminaire's housing. Allowing the antenna to remain on the driver board presents a problem and may reduce the efficacy of the control system. The issue in this case is that the conductive luminaire's housing, typically comprised of aluminum or brass, prevents efficient reception of the controller's signal by the antenna. This can significantly limit the range or distance that the luminaires may be placed away from the controller in the landscape. The challenge with this option is that users may not see the value of the technology because the working range is very or at least somewhat limited when the transmitted signal can be blocked or diminished by the standard conductive aluminum or brass housing material.

Another solution relates to the use of an external antenna on the luminaire or light fixture. In this version, an antenna may be attached to the luminaire and extend to the outside of the housing, thereby allowing for reliable signal reception without interference from the housing, and thus facilitate acceptable and increased spacing across the user's landscape. However, there may be several issues with this solution. One is the added cost of the external antenna. Another is that the external antenna is subject to the hazards of the landscape including damage which may be caused by incidental contact with common landscape mechanical maintenance equipment such as lawnmowers, weedwhackers, and trimmers, and accidental kicks or displacement by the landscaper himself. The external antennas may also be subject to damage due to environmental extremes and even the presence of landscape rodents.

SUMMARY

According to one aspect of the invention, there is provided a lamp fixture or luminaire which may receive signals from an external control source to vary light characteristics or operations of the luminaire, the luminaire comprising a housing, receiving antenna within the housing, and an antenna body portion comprised of a generally non-conductive material, wherein at least a part of the receiving antenna is located within the non-conductive antenna body portion.

Preferably, the lamp fixture comprises a housing made of die cast aluminum, and which may have a chamber for the LED emitter and lens, and another chamber for a driver and electronic hardware. In another embodiment, these components may be accommodated in single chamber within the housing.

The driver is connected to a power source, which may take a number of forms. The power source may be battery, solar, or the lamp fixture may be hardwired to a power outlet source. Further, the driver is connected to the antenna, which extends from the driver to a position within the lamp fixture where it may receive substantially uninterrupted signals, passing through the medium of the non-conductive material from the external control source.

Preferably, the housing includes a knuckle assembly which connects to the housing, and wherein the knuckle assembly itself connects to a ground stake for placing the lamp fixture in the ground. The knuckle assembly, which may be hinged or pivotable so the position or orientation of the housing can be adjusted, is preferably comprised of a non-conductive material so that the portion of the antenna which is contained withing the knuckle assembly is able to receive the signals from the external controller source without being diminished or degraded in any significant way.

The antenna in the lamp fixture may be located in a tubular space or channel constructed knuckle assembly, or it may be in modular form so that it is embedded in the knuckle assembly such as during manufacture, and a connection is established between the antenna and the LED driver or other electronic hardware when the knuckle assembly is connected in modular fashion to the housing.

Note that one embodiment of the invention will provide for the antenna to be located in the non-conductive knuckle assembly, but the invention is not limited to such an arrangement. In this regard, the antenna may be inside, or embedded within, a non-conductive material which is a component other than the knuckle assembly, in a way that the antenna is still able to receive signals from the external control source through the non-conductive material. All of these embodiments are within the scope of the present invention.

BRIEF DESCRIPTION OF THE DRAWINGS

In the drawings:

FIG. 7 is a spec sheet showing properties of a conductive resin that may be used in a luminaire of the invention, although the invention is not limited to a resin of the type described in this figure.

DETAILED DESCRIPTION

Figure 2:
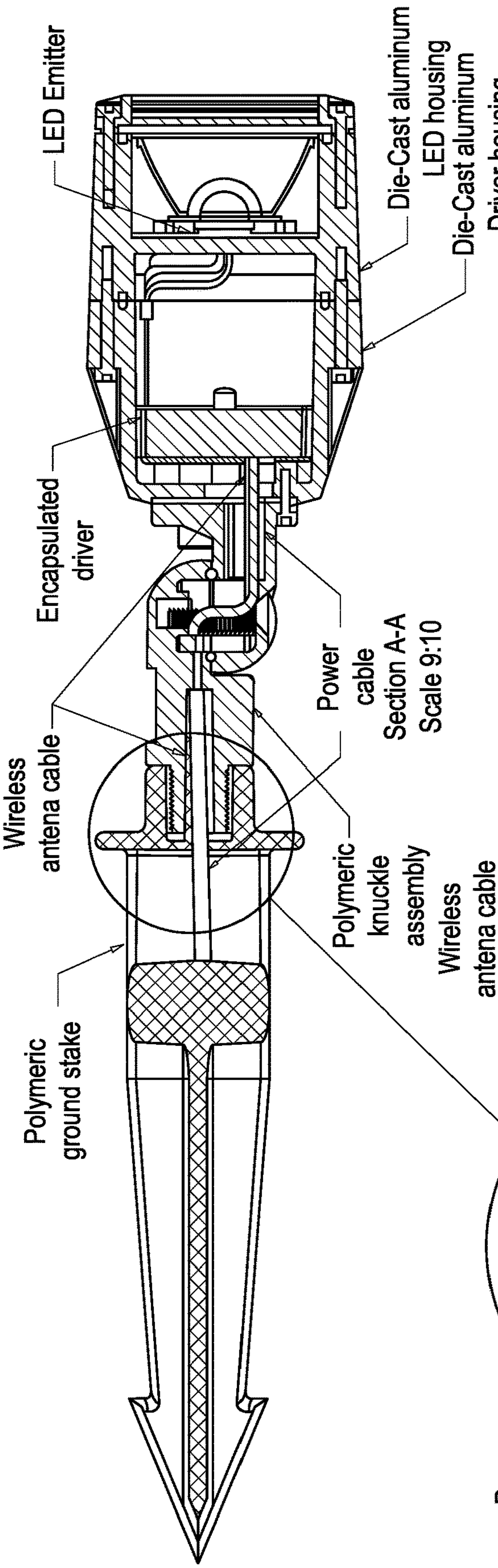
FIG. 2 is a section through the luminaire as shown in FIG. 1 of the drawings.

The accompanying drawings show generally a luminaire 100 with aluminum housing 1. This embodiment may be considered to be an integrated fixture because the lamp component is designed into the fixture (integrated) and not as a separate or interchangeable component. This concept has advantages over an interchangeable lamp design, but it should be understood that the present invention relates to luminaires or lamp fixtures which are both interchangeable and otherwise. The typical design of an integrated fixture (or many other fixtures) includes a LED emitter and a driver to power the emitter.

The driver is the component that houses the antenna component used in Bluetooth technology. The luminaire 100 will of course require an antenna 4 to receive signals from a remote source for controlling aspects and features of the luminaire. In one form, the driver may be positioned or buried within the housing. Because the housing 1 is comprised of aluminum, which is a conductive material, the antenna cannot usually effectively receive a Bluetooth signal without significant or even complete blockage.

The present invention thus describes a unique housing 1 design to address this issue. The housing preferably includes a polymeric non-conductive knuckle assembly 18, 19. This component will usually be located at the bottom of the housing and attaches directly to the ground stake 23. In the present invention, there is a relocation of the receiving component into the knuckle via a wire lead so as to have an antenna component along or at the end of the lead. Because the knuckle assembly material is fully or partially non-conductive, the signal from the external source is thus able to transmit freely to the control source and to other fixtures, thereby completing an efficient Bluetooth or Wi-Fi controlled system.

In one aspect, therefore, the invention relates to the placement of the antenna inside the lamp fixture within a polymeric or non-conductive component (also referred to herein as, at least in part, the knuckle assembly). This antenna placement allows for superior communication from luminaire to luminaire, and from luminaire to control due to the nature of the material being used, namely, fully or at least partially non-conductive material which will not impede or obstruct reception of signals from an external source. The placement of the antenna within the polymeric knuckle of the luminaire, such as within a Bluetooth Mesh controlled landscape lighting system, allows for superior communication extending the range or scope of the system limited only by the Bluetooth signal and not impeded by the luminaire itself as it may be with other fixtures.

The present concept was developed after an iterative design process that included alternative placement of the antenna component within the luminaire's housing as well as experimentation with non-conductive material bands around the antenna component.

In one version of the invention, the driver component was modified to extend the antenna component closer to the glass covered lens of the luminaire. Trials were met with limited and intermittent success. Additional research indicated that the Bluetooth signal preferably requires very little or no interference from conductive materials in the reception path with the controller. Therefore, although the antenna was closer to the glass non-conductive lens, it was still inset within the conductive housing, certainly allowing for improved reception but preventing better reception which could be achieved by different construction.

A further version of the invention incorporated a non-conductive polymeric band within the wall of the conductive housing, thus allowing Bluetooth signals to be received within the housing. However, again due to close proximity of conductive materials in the transmission path, a signal shadow still existed that disrupted to some extent the reception based on relative replacement of the controller and luminaire resulting in a less favorable intermittent and spotty reception of the signal.

Yet a further version of the invention uses, in one embodiment, a non-conductive polymeric knuckle assembly or component which may be at the base of each luminaire. This knuckle creates the rotational joint between the external mount and the luminaire. An internal wire antenna is used to extend the receiving component of the antenna so as to be within this polymeric knuckle for optimum signal reception. The resulting signal transmission was found to meet or exceed that of an external antenna described above. The advantages of this embodiment include cost savings as the internal wire antenna extension is less expensive to construct than an external antenna, and there is no added risk of damage which may result from external factors such as mechanical, maintenance or environmental damage.

Figure 1:
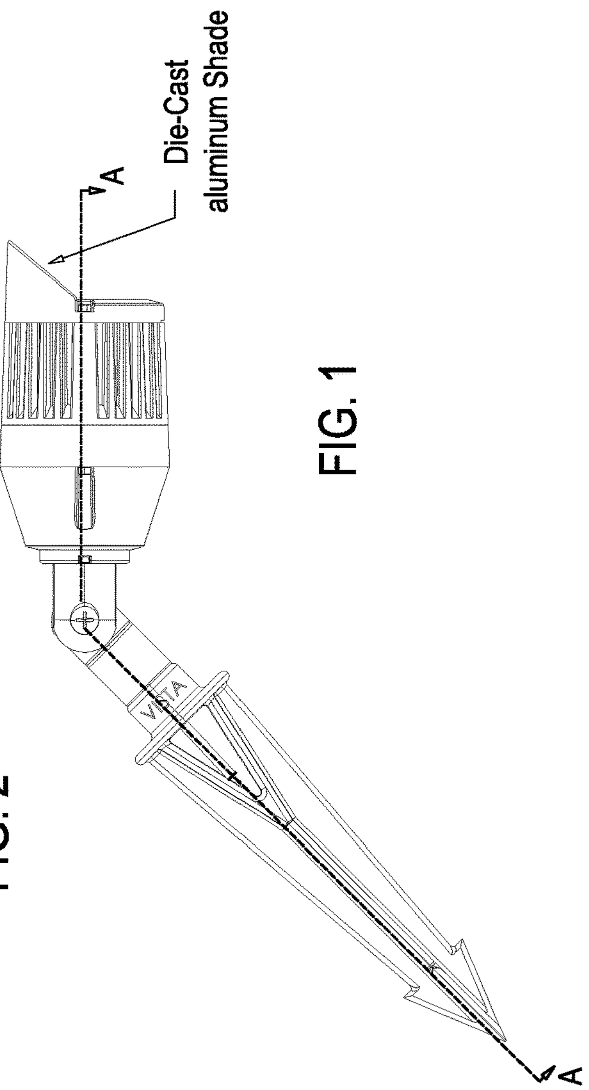
FIG. 1 of the drawings is a side view of one embodiment of a luminaire or light fixture in accordance with one aspect of the invention.
Figure 3:
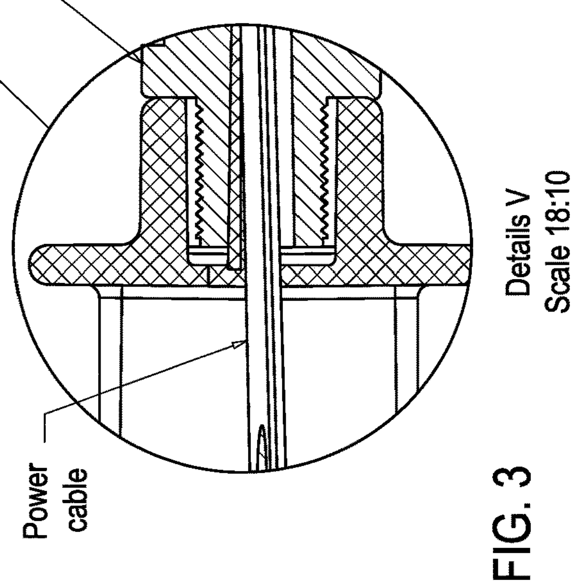
FIG. 3 is a detail of the luminaire illustrated in FIG. 1 of the drawings showing the connection between the knuckle assembly and the grounding stake thereof.

Referring to the figures accompanying this application, FIGS. 1, 2 and 3 show a side view, cross sectional view and detail of a luminaire constructed in accordance with one aspect of the invention. These figures show a luminaire having a die cast aluminum housing which accommodates the LED emitter in one section and the encapsulated driver in another section of the housing. The driver connects to a power cable, which extends through the housing, the polymeric knuckle assembly, and the stake, where it connects to a power source.

A wireless antenna cable also connects to the driver, and extends out of the aluminum housing and into and through the polymeric knuckle assembly. The antenna may be accommodated in a tubular chamber or channel in the knuckle assembly, or it may be embedded therein during the knuckle assembly construction and manufacture so that it can connect to the driver. Any suitable mechanism for the connection falls within the scope of the invention. The antenna should, however, have at least a part thereof within the polymeric or otherwise non-conductive portion of the luminaire so that signals transmitted from an external source can be readily picked up by the antenna to ensure effective and efficient operation.

FIG. 3 of the drawings illustrates a detail of the luminaire of the invention, showing the position of the wireless antenna cable in a channel in the knuckle assembly, and which is surrounded only by non-conductive material for improved reception. This figure also shows the presence of the power cable running through the channel, and further into the ground stake, where it may be connected to a power source. The cable may also be used in order that different luminaires in the system of multiple fixtures may be connected to each other, as well as potential independent operation so that different fixtures in the system may be programmed from the external controller to display different features or operations, thereby providing the invention with more options and flexibility for the user.

Figure 4:
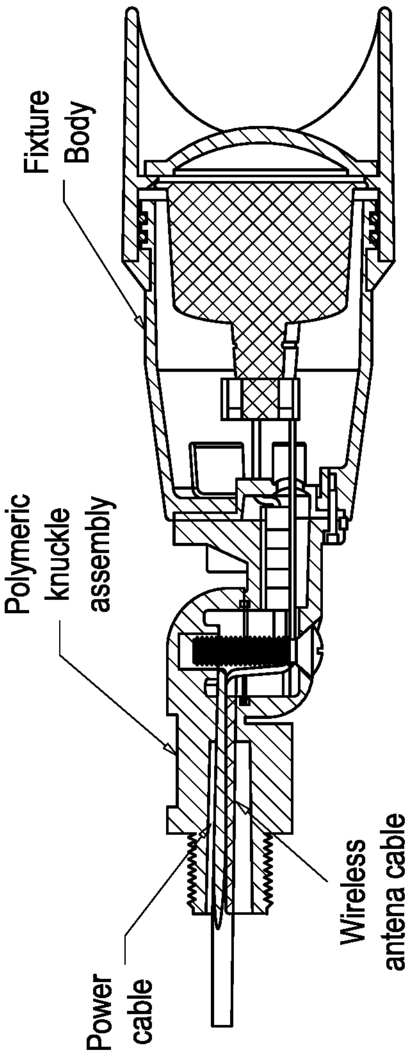
FIG. 4 of the drawings is a cross section through a luminaire of the invention in another embodiment thereof, including the positioning of the antenna cable within the housing of the luminaire.

FIG. 4 of the drawings shows another embodiment of a luminaire of the invention, in this case illustrating a housing or fixture body with a single type chamber for accommodating the LED and the driver or other electronic components. However, this embodiment also shows the presence of the wireless antenna cable extending from the fixture body to the knuckle assembly, so that signals can be received by the antenna where it is not obstructed or otherwise hindered by the presence of a conductive material.

Figure 5:
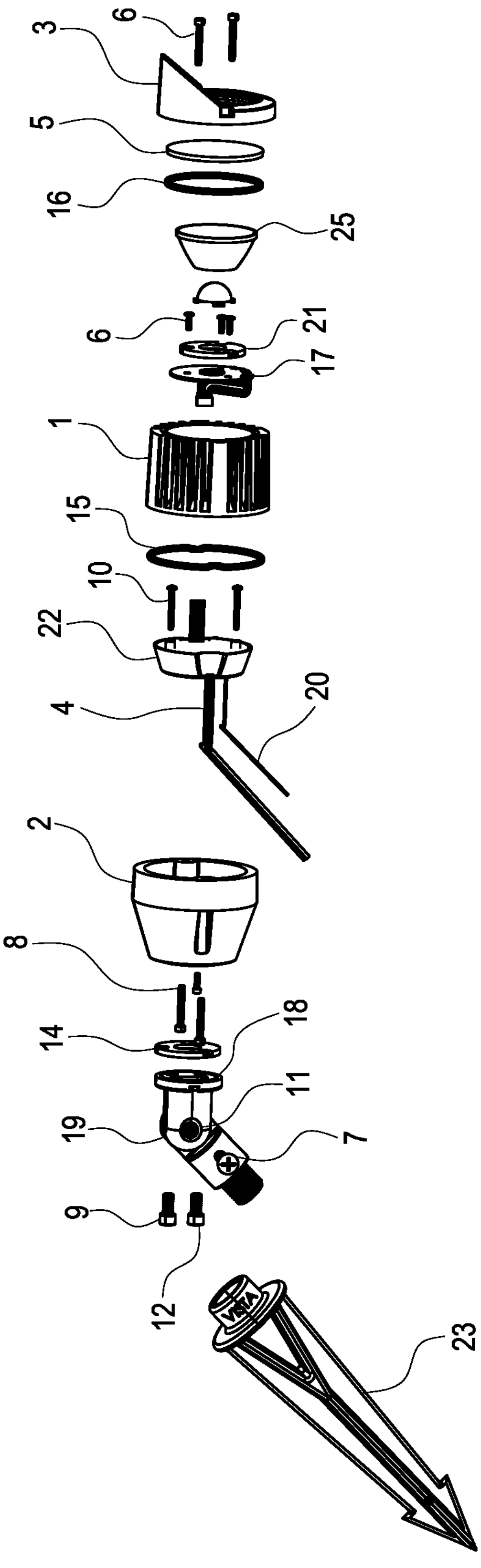
FIG. 5 is an exploded view of the luminaire shown in FIG. 4 of the drawings.
Figure 6:
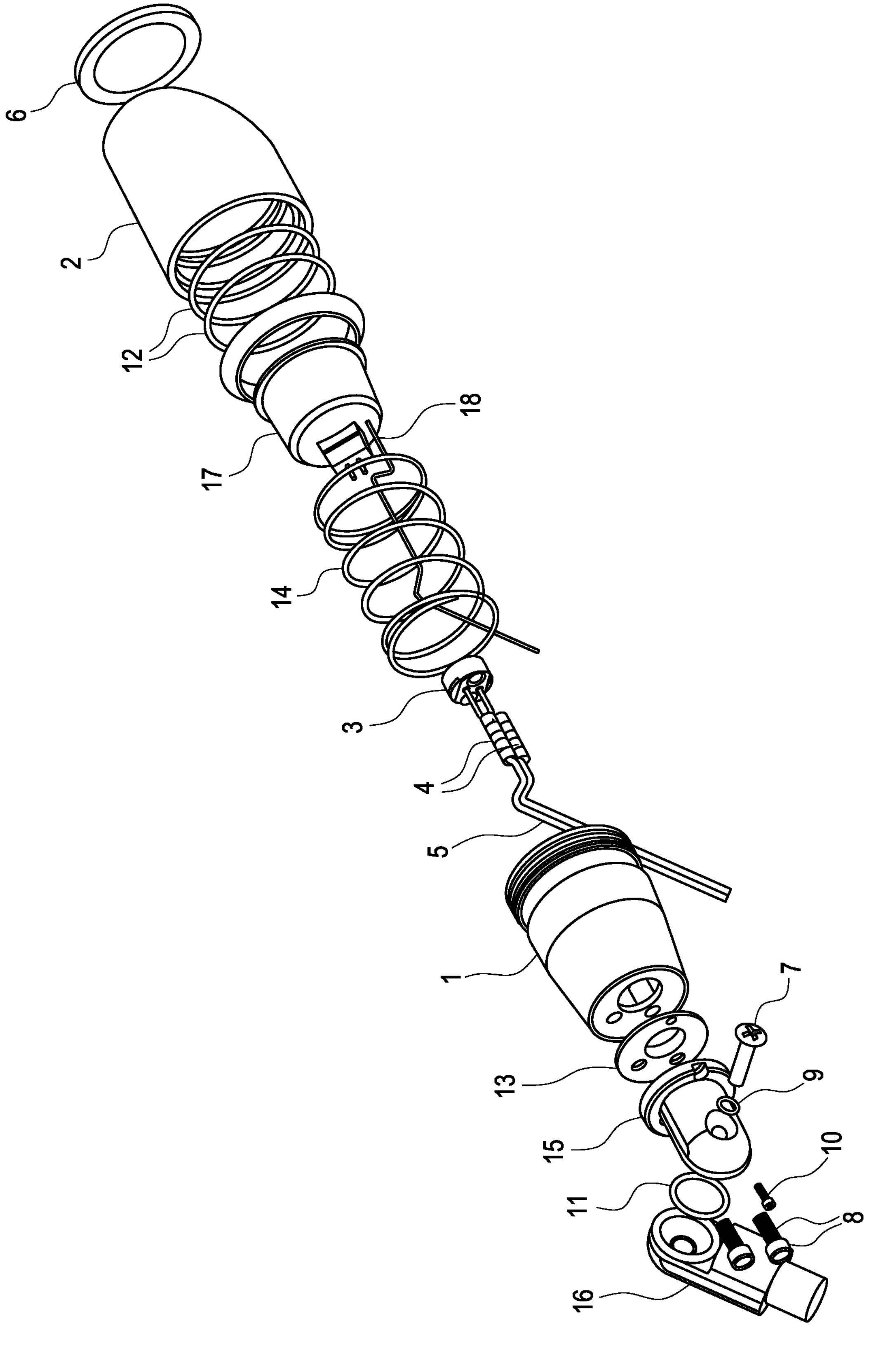
FIG. 6 is an exploded view of a luminaire in accordance with an aspect of the invention.

FIG. 5 shows an exploded view of the embodiment with various parts and components clearly illustrated. FIG. 6 is an illustration in exploded view of a further embodiment of the invention. FIG. 6 also shows a spec sheet showing characteristics of a preferred polymeric material for use in this invention, although any other suitable materials, and different combinations thereof, could be used if these achieved the desired result.

The luminaire or lamp fixture may be controlled through the external controller for many operations. These include adjusting the brightness or dimming the light; changing color or color sequences; changing color temperatures; timing and scheduling any operation or sequences, to name a few. The luminaire may be controlled through an electronic device app on a phone, a tablet, computer, or some other device.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A lamp fixture or luminaire comprising:

a receiver for receiving signals from an external source to vary light characteristics or operations of the luminaire;

a housing comprised at least in part of a conductive material and accommodating the receiver and a first portion of a receiving antenna within the housing;

a light emitter in the housing controlled by the receiver; and an antenna body portion connected to the housing and comprised of a generally non-conductive material, wherein a second portion of the receiving antenna is located within the non-conductive antenna body portion, the second portion of the receiving antenna receiving the receiving signal from the external source and transmitting the signal to the first portion of the receiving antenna to operate the receiver.

2. A lamp fixture as claimed in claim 1 wherein the antenna body portion comprises a knuckle portion adjacent the housing, the knuckle portion comprising generally non-conductive material.

3. A lamp fixture as claimed in claim 2 further comprising a ground stake, the ground stake being attached to the knuckle portion.

4. A lamp fixture as claimed in claim 1 further comprising a first channel, the first channel accommodating a power cable for connecting the light emitter to a power source.

5. A lamp fixture as claimed in claim 1 further comprising a second channel, the second channel accommodating the first and second portions of the receiving antenna for receiving and transmitting signals between the lamp fixture and an external controller.

6. A lamp fixture as claimed in claim 4 wherein the first channel further accommodates the first and second portions of the receiving antenna for receiving and transmitting signals between the lamp fixture and an external controller.

7. A lamp fixture as claimed in claim 1 further comprising a power source selected from one or more of a battery, solar, or hardwired power outlet.

8. A lamp fixture as claimed in claim 4 wherein the first channel is located at least in part within the non-conductive material.

9. A lamp fixture as claimed in claim 1 wherein the receiving antenna is connected to the receiver, the receiving antenna being located at least in part within the non-conductive material.

10. A lamp fixture as claimed in claim 9 wherein the receiving antenna is accommodated within an antenna channel formed in the housing and wherein the antenna channel is surrounded by the non-conductive material.

11. A lamp fixture as claimed in claim 1 wherein the housing is comprised of aluminum material.

12. A lamp fixture as claimed in claim 1 wherein the non-conductive material comprises a polymeric material.

13. A lamp fixture as claimed in claim 1 wherein the receiving signals are transmitted using Wi-Fi or Bluetooth technology.

* * * * *